United States Patent
Yoneda et al.

(10) Patent No.: US 6,858,761 B2
(45) Date of Patent: Feb. 22, 2005

(54) PROCESS FOR PRESERVING RESIN CATALYST FOR ADDITION REACTION OF ALKYLENE OXIDE AND UTILIZATION OF THIS PROCESS

(75) Inventors: Yukihiro Yoneda, Himeji (JP); Tokumasa Ishida, Himeji (JP); Masahiro Uemura, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 187 days.

(21) Appl. No.: 10/100,766

(22) Filed: Mar. 18, 2002

(65) Prior Publication Data

US 2002/0165340 A1 Nov. 7, 2002

(30) Foreign Application Priority Data

Mar. 30, 2001 (JP) ........................................ 2001-101463

(51) Int. Cl.[7] ........................ C07C 29/10; C07C 67/26; B01J 20/24
(52) U.S. Cl. ........................ 568/867; 568/580; 568/594; 568/596; 568/606; 568/619; 568/620; 568/621; 568/622; 568/623; 568/700; 568/701; 568/868; 568/909.5; 560/205; 560/209; 502/20; 502/22; 502/28; 502/56
(58) Field of Search .................... 560/205, 209; 502/20, 22, 28, 56; 528/408; 549/539; 568/580, 594, 596, 606, 619, 620, 621, 622, 623, 700, 701, 867, 868, 909.5, 588

(56) References Cited

U.S. PATENT DOCUMENTS

| | | | | |
|---|---|---|---|---|
| 4,910,329 A | * | 3/1990 | McDade | 560/209 |
| 5,488,184 A | * | 1/1996 | Reman et al. | 568/867 |
| 6,137,015 A | * | 10/2000 | Strickler et al. | 568/867 |
| 6,153,801 A | * | 11/2000 | Van Kruchten | 568/867 |
| 6,384,267 B1 | * | 5/2002 | Shingai et al. | 560/209 |
| 6,448,456 B1 | * | 9/2002 | Strickler et al. | 568/867 |
| 6,610,879 B2 | * | 8/2003 | Yoneda et al. | 560/205 |
| 6,660,881 B2 | * | 12/2003 | Matsumoto et al. | 560/205 |

FOREIGN PATENT DOCUMENTS

GB 1003346 * 9/1965

* cited by examiner

*Primary Examiner*—Jeffrey B. Robertson

(57) ABSTRACT

The present invention provides a process and its utilization in a process comprising the step of carrying out an addition reaction of an alkylene oxide to an addition-receiving substance in the presence of a resin catalyst, thereby producing the addition reaction product, when the resin catalyst as used for the reaction is persevered so as to recycle it after it is recovered, the unreacted alkylene oxide remaining in the resin catalyst can be prevented from polymerizing and solidifying during the preservation, and the resin catalyst accordingly can be preserved stably for a long time. The resin catalyst as recovered after it is used for the reaction may be preserved under any of the following conditions: 1) at a low temperature of not higher than 40° C.; 2) in the presence of a carboxylic acid; 3) in the presence of a liquid having an alkylene oxide concentration of not more than 2 weight %; and 4) in the coexistence of a carboxylic acid and a liquid having an alkylene oxide concentration of not more than 2 weight %. The present catalyst is recycled for the above addition reaction.

19 Claims, No Drawings

US 6,858,761 B2

PROCESS FOR PRESERVING RESIN CATALYST FOR ADDITION REACTION OF ALKYLENE OXIDE AND UTILIZATION OF THIS PROCESS

BACKGROUND OF THE INVENTION

A. Technical Field

In a process comprising the step of carrying out an addition reaction of an alkylene oxide to an addition-receiving substance in the presence of a resin catalyst, thereby producing the addition reaction product, the present invention relates to a process for preserving the resin catalyst as used for the reaction so as to recycle it after being recovered; and utilization of this preserving process.

B. Background Art

In a production process for an addition reaction product (for example, hydroxyalkyl carboxylates and alkylene glycols) by an addition reaction of an alkylene oxide to an addition-receiving substance (for example, carboxylic acids and water) in the presence of a resin catalyst, it is general that the resin catalyst is used in the reaction and thereafter recovered and recycled for a new reaction in order to reduce production costs.

However, when the resin catalyst as used for the reaction is persevered so as to recycle it after it is recovered, there are problems as follows: the unreacted alkylene oxide remaining in the resin catalyst polymerizes and solidifies during the preservation, so the resin catalyst cannot be preserved well and therefore cannot be recycled.

SUMMARY OF THE INVENTION

A. Object of the Invention

An object of the present invention is to provide a process and its utilization in a process comprising the step of carrying out an addition reaction of an alkylene oxide to an addition-receiving substance in the presence of a resin catalyst, thereby producing the addition reaction product, when the resin catalyst as used for the reaction is persevered so as to recycle it after it is recovered, the unreacted alkylene oxide remaining in the resin catalyst can be prevented from polymerizing and solidifying during the preservation, and the resin catalyst accordingly can be preserved stably for a long time.

B. Disclosure of the Invention

The present inventors diligently studied to solve the above-mentioned problems. As a result, they have completed the present invention by finding out that the resin catalyst as recovered after it is used for the reaction may be preserved under any of conditions 1) to 4) as shown below:

1) At a low temperature of not higher than 40° C.
2) In the presence of a carboxylic acid.
3) In the presence of a liquid having an alkylene oxide concentration of not more than 2 weight %.
4) In the coexistence of a carboxylic acid and a liquid having an alkylene oxide concentration of not more than 2 weight %.

Accordingly, one of processes for preserving a resin catalyst for an addition reaction of an alkylene oxide, according to the present invention, comprises the steps of: carrying out a reaction in which an addition reaction product is produced by an addition reaction of an alkylene oxide to an addition-receiving substance in the presence of the resin catalyst; and thereafter recovering and then preserving the resin catalyst; with the process being characterized in that the step of preserving the resin catalyst is carried out at a low temperature of not higher than 40° C.

Another process for preserving a resin catalyst for an addition reaction of an alkylene oxide, according to the present invention, comprises the steps of: carrying out a reaction in which an addition reaction product is produced by an addition reaction of an alkylene oxide to an addition-receiving substance in the presence of the resin catalyst; and thereafter recovering and then preserving the resin catalyst; with the process being characterized in that the step of preserving the resin catalyst is carried out in the presence of a carboxylic acid.

Yet another process for preserving a resin catalyst for an addition reaction of an alkylene oxide, according to the present invention, comprises the steps of: carrying out a reaction in which an addition reaction product is produced by an addition reaction of an alkylene oxide to an addition-receiving substance in the presence of the resin catalyst; and thereafter recovering and then preserving the resin catalyst; with the process being characterized in that the step of preserving the resin catalyst is carried out in the presence of a liquid having an alkylene oxide concentration of not more than 2 weight %.

Yet another process for preserving a resin catalyst for an addition reaction of an alkylene oxide, according to the present invention, comprises the steps of: carrying out a reaction in which an addition reaction product is produced by an addition reaction of an alkylene oxide to an addition-receiving substance in the presence of the resin catalyst; and thereafter recovering and then preserving the resin catalyst; with the process being characterized in that the step of preserving the resin catalyst is carried out in the coexistence of a carboxylic acid and a liquid having an alkylene oxide concentration of not more than 2 weight %.

A process for producing an addition reaction product by an addition reaction of an alkylene oxide to an addition-receiving substance, according to the present invention, comprises the step of carrying out the addition reaction of the alkylene oxide to the addition-receiving substance in the presence of a resin catalyst, thereby producing the addition reaction product; with the process being characterized in that a resin catalyst which has been preserved by any one of the processes as shown above is recycled for the addition reaction.

These and other objects and the advantages of the present invention will be more fully apparent from the following detailed disclosure.

DETAILED DESCRIPTION OF THE INVENTION

In the first place, the outline of a process for producing an addition reaction product of the alkylene oxide with the resin catalyst to which the characteristic preservation process according to the present invention is favorably applicable is explained in the following way.

First of all, the addition reaction of the alkylene oxide to the addition-receiving substance is carried out in the presence of the resin catalyst (hereinafter, the resin catalyst may be referred to simply as "catalyst"). The conversion in this addition reaction is often less than 100%, and the resultant reaction liquid at the end of the reaction generally includes residues, such as unreacted alkylene oxides or unreacted addition-receiving substances. Therefore, after the end of the reaction, the above reaction liquid is fed to a step of removing such as these unreacted residues of raw materials from the reaction liquid. Then, the purification is carried out by such as distillation as a subsequent final step, with the result that the aimed addition reaction product is obtained.

Incidentally, the addition-receiving substance for the addition reaction of the alkylene oxide is not especially limited, but examples thereof include water, carboxylic acids, and alcohols. When the addition-receiving substance is water, an alkylene glycol is produced as the addition reaction product. When the addition-receiving substance is a carboxylic acid, a hydroxyalkyl carboxylate is produced as the addition reaction product. When the addition-receiving substance is an alcohol, an alkylene glycol monoether is produced as the addition reaction product. The addition-receiving substance is favorably water or a carboxylic acid, more favorably a carboxylic acid, in view of stabilizing the resin catalyst for the addition reaction of the alkylene oxide when preserving the resin catalyst. When the addition-receiving substance is water or a carboxylic acid, or particularly a carboxylic acid, the extraordinary reaction in the resin catalyst and in the neighborhood thereof can be suppressed, and therefore the preservation stability is improved.

On the other hand, as to the polymerizability of the addition-receiving substance, the alkylene oxide has possibility of polymerization even alone. Furthermore, among the addition-receiving substances, an unsaturated carboxylic acid (particularly, (meth)acrylic acid) has danger of polymerization even alone. Therefore, even when the resin catalyst for the addition reaction of the alkylene oxide in an addition reaction between the alkylene oxide and the (meth) acrylic acid both of which have polymerizability (in this reaction, a hydroxyalkyl(meth)acrylate is produced as the addition reaction product) is preserved, the present invention displays effects most favorably.

Hereinafter, the addition reaction step in the presence of the catalyst is explained by referring to examples of the addition reaction between the carboxylic acid and the alkylene oxide.

When the present invention is carried out, as to the amount of the raw materials as charged in the above reaction between the carboxylic acid and the alkylene oxide, the amount of the alkylene oxide is favorably not less than 1 mol, more favorably in the range of 1.0 to 5.0 mols, still more favorably 1.0 to 3.0 mols, yet still more favorably 1.0 to 2.0 mols, per 1 mol of the carboxylic acid. In the case where the amount of the alkylene oxide as charged is less than 1.0 mol, there are disadvantages in that the conversion is lowered and by-products are increased. In addition, in the case where the amount of the alkylene oxide as charged is too much, particularly more than 5 mols, there are disadvantages in economy.

The carboxylic acid usable as a raw material of the hydroxyalkyl carboxylate in the present invention is not especially limited. Examples thereof include acrylic acid, methacrylic acid, acetic acid, propionic acid, butyric acid, maleic acid, fumaric acid, succinic acid, benzoic acid, terephthalic acid, citric acid, salicylic acid, trimellitic acid, and pyromellitic acid. Acrylic acid and methacrylic acid are particularly favorable (these are jointly referred to as (meth) acrylic acid in the present specification.).

In addition, the alkylene oxide usable in the present invention is not especially limited, but it has favorably 2 to 6 carbon atoms, more favorably 2 to 4 carbon atoms. Examples thereof include ethylene oxide, propylene oxide, and butylene oxide. Ethylene oxide and propylene oxide are favorable, and ethylene oxide is particularly favorable.

In the present invention, the reaction between the carboxylic acid and the alkylene oxide in the presence of the catalyst can be carried out according to methods generally used for this kind of reaction.

For example, when the reaction is carried out in a batch manner, it is carried out by introducing the liquid alkylene oxide into the carboxylic acid. When the carboxylic acid is solid, the alkylene oxide may be introduced after the carboxylic acid is dissolved into a solvent. Then, the alkylene oxide may be added to the carboxylic acid in a lump, continuously, or intermittently. Then, when it is added continuously or intermittently, it is also possible that: as is often the case with this kind of reaction, the reaction is continued still after the introduction of the alkylene oxide, in other words, the aging is carried out, and thereby the reaction is completed. In addition, it is not always necessary to initially add the carboxylic acid all at once, and it can also be divided into some portions and then added.

In addition, when the reaction is carried out in a continuous manner, it is carried out by continuously adding the carboxylic acid and the liquid alkylene oxide into a reactor such as a tubular or tank reactor, and by continuously extracting the resultant reaction liquid from the reactor. In this case, the catalyst may continuously be supplied together with the raw materials and then continuously be extracted together with the resultant reaction liquid. In the case of the reactor such as a tubular reactor, a solid catalyst may be used in what is called a fixed-bed manner in which the solid catalyst is used in a state filled in the reactor. In addition, in the case of the tank reactor, the solid catalyst may be used in what is called a fluidized-bed manner in which the solid catalyst is used in a state fluidized together with the reaction liquid in the reactor. In the cases of these continuous reactions, the reaction liquid may be partially circulated.

As to the addition of the raw carboxylic acid and the raw alkylene oxide into the reactor, they may be added from separate addition lines respectively, or they may be added to the reactor after being beforehand blended in such as a pipe, a line mixer or a mixing tank before being added to the reactor. In addition, when the liquid obtained from the reactor outlet is circulated to the inlet of the reactor, or when the unreacted carboxylic acid or the unreacted alkylene oxide is recovered and then recycled, these liquids may be added to the reactor after blending them with the raw carboxylic acid or the raw alkylene oxide. However, when the carboxylic acid and the alkylene oxide are added from separate addition lines into the reaction liquid, the molar ratio of the carboxylic acid in the reaction liquid is excess in the neighborhood where the carboxylic acid is added. Therefore, it is favorable that the respective raw materials are added to the reactor after being beforehand blended in such as a pipe before being added to the reactor.

The reaction temperature is usually favorably in the range of 40 to 130° C., more favorably 50 to 100° C. In the case where the reaction temperature is lower than 40° C., the reaction proceeds so slowly as to be apart from a practical level. On the other hand, in the case where the reaction temperature is higher than 130° C., there are disadvantages in that: the by-products are increased; and when the carboxylic acid as a raw material has an unsaturated double bond, such as polymerization of this unsaturated carboxylic acid or the hydroxyalkyl unsaturated carboxylate as a product therefrom is caused.

In addition, the reaction may be carried out in a solvent for the purpose of such as mildly carrying out the reaction. As to the solvent, for example, the following conventional solvents can be used: toluene, xylene, heptane, and octane. The pressure in the reaction system depends upon the kinds or mixing ratio of the raw materials, but the reaction is generally carried out under applied pressure.

In addition, when the reaction and the preservation of the resin catalyst are carried out, conventional polymerization inhibitors can be used as stabilizers. Examples thereof include: phenol compounds, such as hydroquinone, methylhydroquinone, tert-butylhydroquinone, 2,6-di-tert-butylhydroquinone, 2,5-di-tert-butylhydroquinone, 2,4-dimethyl-6-tert-butylphenol, hydroquinone monomethyl ether, cresol, and tert-butylcatechol; 1,4-phenylenediamines, such as N-isopropyl-N'-phenyl-1,4-phenylenediamine, N-(1,3-dimethylbutyl)-N'-phenyl-1,4-phenylenediamine, N-(1-methylheptyl)-N'-phenyl-1,4-phenylenediamine, N,N'-diphenyl-1,4-phenylenediamine, and N,N'-di-2-naphthyl-1,4-phenylenediamine; amine compounds such as thiodiphenylamine and phenothiazine; copper dialkyldithiocarbamates, such as copper dibutyldithiocarbamate, copper dipropyldithiocarbamate, copper diethyldithiocarbamate, and copper dimethyldithiocarbamate; copper diaryldithiocarbamates, such as copper diphenyldithiocarbamate; nitroso compounds, such as nitrosophenol, N-nitrosodiphenylamine, isoamyl nitrite, N-nitroso-cyclohexylhydroxylamine, N-nitroso-N-phenyl-N-hydroxylamine, and their salts; N-oxyl compounds, such as 2,2,4,4-tetramethylazetidine-1-oxyl, 2,2-dimethyl-4,4-dipropylazetidine-1-oxyl, 2,2,5,5-tetramethylpyrrolidine-1-oxyl, 2,2,5,5-tetramethyl-3-oxopyrrolidine-1-oxyl, 2,2,6,6-tetramethylpiperidine-1-oxyl, 4-hydroxy-2,2,6,6-tetramethylpiperidine-1-oxyl, 6-aza-7,7-dimethyl-spiro(4,5) decane-6-oxyl, 2,2,6,6-tetramethyl-4-acetoxypiperidine-1-oxyl, 2,2,6,6-tetramethyl-4-benzoyloxypiperidine-1-oxyl, and 4,4',4"-tris-(2,2,6,6-tetramethylpiperidine-1-oxyl) phosphate; tetraalkylthiuram disulfides, such as tetraalkylthiuram disulfide, tetrapropylthiuram disulfide, tetraethylthiuram disulfide, and tetramethylthiuram disulfide; and Methylene Blue. The polymerization inhibitors may be used either alone respectively or in combinations with each other. When the reaction is carried out, the amount of the polymerization inhibitor as added is favorably in the range of 0.0001 to 1 weight %, more favorably 0.001 to 0.5 weight %, of the carboxylic acid. When the preservation is carried out, the amount of the polymerization inhibitor as added is favorably in the range of 0.001 to 1 weight %, more favorably 0.001 to 0.5 weight %, of the preserving liquid.

In addition, when the occasion demands, the effect of inhibiting the polymerization is further improved if molecular oxygen is further used together.

In the present invention, the resin catalyst is used as the catalyst for the reaction to produce the addition reaction product by the addition reaction of the alkylene oxide to the addition-receiving substance. There are an acidic resin catalyst and a basic resin catalyst as the resin catalyst, and either or both of them can be used.

The above acidic resin catalyst is a polymer compound that has an acidic group such as sulfonic acid group and is insoluble in the reaction liquid. Among them, a strong acidic cation-exchange resin is particularly favorable. Specific examples of the strong acidic cation-exchange resin are not especially limited, but they include: MSC-1, HCR-S, HCR-W2, and HGR-W2 (these are products of Dow); PK-208, PK-212, PK-216, PK-220, PK-228, SK-1B, SK-106, and SK-110 (these are products of Mitsubishi Chemical Corporation); AMBERLYST-16, IR-116, IR-118, IR-122, C-26, C-26TR, C-264, and C-265 (these are products of Rohm and Haas); SPC-108 and SPC-112 (these are products of Bayer A.G.); and KC470 (this is a product of Sumitomo Chemical Co., Ltd.).

In addition, the above basic resin catalyst is a polymer compound that has a basic functional group and is insoluble in the reaction liquid. Examples thereof include polymer compounds having a basic functional group, such as tertiary amine compounds, quaternary ammonium salts, cyclic amine compounds (for example, pyridine), and sulfides. In addition, this basic resin catalyst is also a polymer containing such as a nitrogen atom and/or a sulfur atom in its molecule. Specific examples thereof include: polymers obtained by polymerizing one or more monomers such as ethylenimine, vinylpyrrolidone, dimethylaminoethyl (meth) acrylate, diethylaminoethyl(meth)acrylate, acrylonitrile, acrylamide, and ethylene sulfide; and copolymers obtained by copolymerizing one or more copolymerizable monomers (for example, styrene, vinyl ether, and divinyl ether) with one or more of the above monomers. The basic resin catalyst is favorably a basic anion-exchange resin, particularly favorably a basic anion-exchange resin having an amino group as the basic functional group.

Either a strong or weak basic anion-exchange resin can be used as the basic anion-exchange resin, but the strong basic anion-exchange resin is favorably used. In addition, any of gel types, porous types, microporous types, primarily crosslinked types, and secondarily crosslinked types can be used.

Specific examples of the gel type are not especially limited, but they include SBR, SBR-P-C, and SAR (these are products of Dow); IRA-400, A-132, ES-137, A-101D, A-147, A-104, A-109, and A-102D (these are products of Rohm and Haas); and SA10A and SA20A (these are products of Mitsubishi Chemical Corporation).

Specific examples of the porous type are not especially limited, but they include IRA-904, IRA-411, IRA-402, and IRA-402BL (these are products of Rohm and Haas).

Specific examples of the microporous type are not especially limited, but they include MSA-1 and MSA-2 (these are products of Dow); IRA-900, IRA-938, IRA-958, A-26, A-27, A-161, and A-162 (these are products of Rohm and Haas); and PA306, PA308, PA312, PA316, PA318, PA406, PA408, PA412, PA416, PA418, WA30, WA20, and WK10 (these are products of Mitsubishi Chemical Corporation).

Specific examples of the weak basic anion-exchange resin are not especially limited, but they include weak basic anion-exchange resins in which the kind of the amine used as the functional group is such as dimethylamine.

Specific examples of the strong basic anion-exchange resin are not especially limited, but they include: (I)-types in which the kind of the amine used as the functional group is such as a trimethylammonium group; and (II)-types in which the kind of the amine used as the functional group is such as a dimethylethanolammonium group.

The resin catalyst may be used either alone respectively or in combinations with each other.

The resin used as the catalyst in the present invention favorably has an average particle diameter of 300 to 5,000 $\mu$m.

In the case where the above average particle diameter is outside the range of 300 to 5,000 $\mu$m, specifically, in the case where the average particle diameter is smaller than 300 $\mu$m, it results in decreasing the reaction activity, and in the case where the average particle diameter is larger than 5,000 $\mu$m, the decrease of the reaction activity is caused by reduction of the surface area of the resin catalyst. Therefore, both cases are disadvantageous. The average particle diameter is more favorably in the range of 400 to 2,000 µm.

The amount of the above catalyst as used for carrying out the present invention is not especially limited, but, when the catalyst is a heterogeneous catalyst and when the reaction is carried out in a batch manner, the catalyst is usually used in the range of 5 to 50 weight %, particularly favorably 10 to 30 weight %, of the raw carboxylic acid. In addition, when the reaction is carried out in a continuous manner and when the catalyst is used in the fluidized-bed manner in such as the tank reactor, the catalyst is usually used in the range of 30 to 90 vol %, favorably 50 to 80 vol %, of the volume of the reaction liquid. In addition, when the catalyst is used in the fixed-bed manner in such as the tubular reactor, a liquid containing the raw reaction materials is favorably allowed to pass through in the range of 0.05 to 15, more favorably 0.2 to 8, in liquid hourly space velocity (LHSV: $h^{-1}$).

In the present invention, the resultant crude hydroxyalkyl carboxylate may further be purified when the occasion demands. The purification method is not especially limited, but examples thereof include purification by distillation, more specifically, distillation involving the use of such as conventional distillation columns, packed columns, or rectifying columns (e.g. bubble cap columns, perforated-plate columns), but there is no especial limitation thereto. In addition, other purification means may be used jointly with the distillation purification.

In the process according to the present invention, after being used for the reaction, the resin catalyst is recovered and then preserved in order to recycle it.

Incidentally, "recovering and then preserving the resin catalyst" as referred to in the present invention includes not only a mode of recovering the resin catalyst outside the reactor and then preserving the recovered resin catalyst, but also a mode of preserving the resin catalyst in a state placed in the reactor itself. Incidentally, hereupon, "the reactor" as used for preserving the resin catalyst is often exactly what has been used for the reaction, but the reactor is not limited thereto. For example, the reactor may be a reactor used for the next reaction.

If the resin catalyst is dried and then preserved, the treatment is complicated and further the drying costs are high. Therefore, the resin catalyst is preserved in the presence of a liquid. Incidentally, hereupon, "the resin catalyst is preserved in the presence of a liquid", for example, means that the resin catalyst is preserved under conditions where the resin catalyst is swollen with the liquid wherein the resin catalyst is undried and contains the liquid, or is dispersed or precipitated in the liquid (hereinafter, such a liquid as used for the preservation is referred to as "preserving liquid"). As to this preserving liquid, the reaction liquid which has been used for the reaction may be used exactly as it is, or the preserving liquid may be such as obtained by, after the reaction, subjecting the reaction liquid to treatments such as washing of the resin catalyst or adjustment of the components of the reaction liquid.

The constituent of the preserving liquid is not especially limited, but examples thereof include: water; carboxylic acids; alkylene oxides; hydroxyalkyl carboxylates, such as hydroxyalkyl(meth)acrylates (for example, 2-hydroxyethyl acrylate, 2-hydroxyethyl methacrylate, hydroxypropyl acrylate, hydroxypropyl methacrylate, hydroxybutyl acrylate, and hydroxybutyl methacrylate); alcohols, such as methanol, ethanol, and propanol; alkylene glycols, such as ethylene glycol, propylene glycol, and butylenes glycol; organic solvents, such as benzene, toluene, and xylene. These may be used either alone respectively or in combinations with each other.

The water, which is mentioned above as an example of the constituent of the preserving liquid, may be unreacted water remaining after reactions between water and alkylene oxides by use of the resin catalyst which is an object of the preservation, or water that has been newly added after the reactions, or both.

Specific examples of the carboxylic acid, which is mentioned above as an example of the constituent of the preserving liquid, are not especially limited, but they can include the same as are aforementioned as specific examples of carboxylic acids usable as raw reaction materials for the hydroxyalkyl carboxylate. This carboxylic acid may be an unreacted carboxylic acid remaining after reactions between carboxylic acids and alkylene oxides by use of the resin catalyst which is an object of the preservation, or a carboxylic acid that has been newly added after the reactions, or both.

Specific examples of the alkylene oxide, which is mentioned above as an example of the constituent of the preserving liquid, are not especially limited, but they can include the same as are aforementioned as specific examples of alkylene oxides usable as raw reaction materials. This alkylene oxide is usually an unreacted alkylene oxide remaining after reactions between addition-receiving substances and alkylene oxides by use of the resin catalyst which is an object of the preservation.

The hydroxyalkyl carboxylate, which is mentioned above as an example of the constituent of the preserving liquid, may be a product formed by reactions between carboxylic acids and alkylene oxides by use of the resin catalyst which is an object of the preservation, or a hydroxyalkyl carboxylate that has been newly added after the reactions, or both.

The alkylene glycol, which is mentioned above as an example of the constituent of the preserving liquid, may be a product formed by reactions between water and alkylene oxides by use of the resin catalyst which is an object of the preservation, or an alkylene glycol that has been newly added after the reactions, or both.

The preservation temperature of the resin catalyst is not especially limited, because it is different according to such as amounts of such as alkylene oxide, carboxylic acid, and water as included in the resin catalyst and/or the preserving liquid, but examples thereof are as follows.

When the alkylene oxide is excessive in the molar ratio between the alkylene oxide and the carboxylic acid (the carboxylic acid is less), the preservation temperature is, favorably for long-term preservation, a low temperature of not higher than 40° C., more favorably not higher than 30° C., still more favorably not higher than 25° C., yet still more favorably not higher than 15° C. In the case where the preservation temperature is higher than 40° C., the carboxylic acid is consumed by its reaction with the alkylene oxide during the preservation, and then there are left behind the alkylene oxide and such as ester or water. When the amount of the carboxylic acid decreases in this way, extraordinary reactions between the alkylene oxide and other components become easily caused in the resin catalyst and/or its neighborhood. In addition, in the case where the preservation temperature is higher than 40° C., unless the alkylene oxide concentration in the preserving liquid is not more than 2 weight %, the alkylene oxide polymerizes and solidifies during the preservation, so the resin catalyst cannot be preserved well and therefore cannot be recycled.

When the alkylene oxide is less in the molar ratio between the alkylene oxide and the carboxylic acid (the carboxylic acid is excessive), the preservation temperature is favorably not higher than 100° C., more favorably for long-term preservation, not higher than 80° C., still more favorably not higher than 40° C., yet still more favorably not higher than 25° C. In the case where the preservation temperature is higher than 100° C., there are disadvantages because there are tendencies such that: not only do viscous materials or polymers form, but also the resin catalyst is deteriorated.

When the alkylene oxide and water coexist, the preservation temperature is favorably not higher than 80° C., more favorably not higher than 40° C., still more favorably not higher than 25° C. In the case where the preservation temperature is higher than 80° C., there are disadvantages because there are tendencies such that: the reaction proceeds rapidly in the resin catalyst, or viscous materials or polymers form in the preserving liquid and in the resin catalyst.

When the resin catalyst is, as the occasion demands, cooled to about 15° C. by water as cooled with a freezer, there are advantages in that the preservation can be carried out still more stably.

When the resin catalyst is preserved in the presence of the carboxylic acid, there are advantages as follows: especially as to the basic resin catalyst, the acid group of the carboxylic acid coordinates onto the basic resin catalyst, whereby the basic resin catalyst or the preserving liquid becomes so stable that polymerization reactions or extraordinary reactions are suppressed during the preservation, therefore the upper limit of the favorable preservation temperature range can be raised to maximally about 80–100° C. The upper limit of the carboxylic acid concentration in the preserving liquid is not especially limited, but this concentration is favorably not less than 0.01 weight %, more favorably not less than 0.1 weight %, still more favorably not less than 1 weight %. In the case where of the carboxylic acid concentration is less than 0.01 weight %, there are disadvantages because there are tendencies such that the above effect as caused by the presence of the carboxylic acid is difficult to obtain.

If the preservation temperature is not higher than 40° C., there is no especial limitation with regard to the alkylene oxide concentration in the preserving liquid, but it is favorably not more than 2 weight %, more favorably not more than 1 weight %, still more favorably not more than 0.5 weight %, yet still more favorably not more than 0.1 weight %, yet still more favorably not more than 0.01 weight %. In the case where the alkylene oxide concentration is more than 2 weight %, unless the resin catalyst is preserved while being controlled to not higher than 40° C. under stirring, the alkylene oxide polymerizes and solidifies during the preservation, so the resin catalyst cannot be preserved well and therefore cannot be recycled. On the other hand, if the alkylene oxide concentration is not more than 2 weight %, there are advantages in that even if the stirring is not carried out during the preservation or even if the preservation temperature is higher than 40° C. (however, the maximum preservation temperature is favorably in the range of about 80 to about 100° C.), the alkylene oxide can be prevented from polymerizing and solidifying during the preservation.

The water content of the preserving liquid is favorably not less than 0.2 weight %, more favorably not less than 2 weight %, still more favorably not less than 20 weight %, most favorably 100 weight %. In the case where the water content of the preserving liquid is less than 0.2 weight %, there are disadvantages as follows: during the preservation, the polymerizability of such as the residual alkylene oxide, the carboxylic acid, and the resultant ester is accelerated to form polymers in the resin catalyst being preserved or between the neighborhood thereof and the preserving liquid, therefore the resin catalyst is aggregated and solidified or the viscosity of the preserving liquid is increased. On the other hand, in the case where the water content of the preserving liquid is not less than 0.2 weight %, there are advantages in that the polymerizability of such as the residual alkylene oxide, the carboxylic acid, and the resultant ester is suppressed during the preservation. In addition, in the case where the water content of the preserving liquid is not less than 0.2 weight %, there are advantages as follows: during the preservation, the residual alkylene oxide is consumed by its reaction with water to form an alkylene glycol, therefore the residual alkylene oxide can more certainly be prevented from polymerizing and solidifying. Furthermore, in the case where the water content of the preserving liquid is not less than 0.2 weight %, there are advantages as follows: the polymerization is, as mentioned above, difficult to cause, therefore the upper limit of the favorable preservation temperature range can be raised to maximally about 80–100° C.

The amount of the preserving liquid is not especially limited, because it is different according to such as whether the stirring is carried out during the preservation or not, but examples thereof are as follows.

If the stirring is not carried out during the preservation, the amount of the preserving liquid is favorably in the range of 5 to 500 volume %, more favorably 50 to 300 volume %, still more favorably 100 to 200 volume %, of the apparent volume of the resin catalyst. In the case where the amount of the preserving liquid is less than 5 volume %, there are tendencies such that the resin catalyst dries during the preservation and then the surface thereof cracks, or that the effect of the preserving liquid is difficult to obtain, because the preserving liquid does not sufficiently spread all over the resin catalyst. In the case where the amount of the preserving liquid is more than 500 volume %, a large amount of the preserving liquid is necessary and then a preserving tank must be enlarged, and there are problems of such as preservation space and treatment of the preserving liquid. Therefore, both cases are disadvantageous.

If the stirring is carried out during the preservation, the needed amount of the preserving liquid is at least a liquid amount necessary to stir. Specifically, the amount is favorably in the range of 110 to 500 volume %, more favorably 130 to 300 volume %, still more favorably 140 to 200 volume %, of the apparent volume of the resin catalyst. In the case where the amount of the preserving liquid is less than 110 volume %, there are tendencies such that: uniform mixing is not accomplished, or if uniform stirring is attempted, so strong stirring is necessary that the resin catalyst is damaged or broken. In the case where the amount of the preserving liquid is more than 500 volume %, a large amount of the preserving liquid is necessary and then a preserving tank must be enlarged, and there are problems of such as preservation space and treatment of the preserving liquid. Therefore, both cases are disadvantageous.

If the resin catalyst is preserved under stirring, there are advantages in that such as polymerization and solidification of such as the alkylene oxide is more unlikely to occur during the preservation. The stirring is not especially limited, but it can be carried out with apparatuses as generally used for this kind of stirring, such as stirring apparatuses having stirring blades. In addition, the stirring can be carried out also by a method that involves bubbling of the preserving liquid with an oxygen-containing gas such as air. Furthermore, the stirring can be carried out also by a method that involves circulating and fluidizing the preserving liquid with such as a pump, and this method is effective particularly in the case of a fixed bed.

When the above stirring apparatuses having stirring blades are used, the tip speed of the stirring blades is favorably set in the range of 0.1 to 10 m/s, more favorably 0.3 to 5 m/s, still more favorably 0.5 to 3 m/s.

The above tip speed of the stirring blades is calculated from the rotation diameter (span) and the stirring revolutions per minute of the tips of the stirring blades according to the following equation:

Tip speed of stirring blades (m/s)=rotation diameter (span)(m)× stirring revolutions per minute (rpm)×π/60

The case where the tip speed of the stirring blades is more than 10 m/s is uneconomical because the equipment cost and the running cost of motive power for the stirring are high. In addition, this case is disadvantageous in that the force is applied to the resin catalyst so excessively as to damage or break the resin catalyst.

On the other hand, in the case where the tip speed of the stirring blades is less than 0.1 m/s, there are disadvantages in that: the resin catalyst is so difficult to float in the preserving liquid that a resident portion locally occurs; and therefore local non-uniformity of the temperature or concentration occurs to easily cause such as polymerization.

Incidentally, it is not always necessary to stir the resin catalyst during the preservation. Depending upon preservation conditions, the resin catalyst can stably be preserved for a long time even if the stirring is not carried out during the preservation. The favorable conditions therefor are not especially limited, but examples thereof include a case where the alkylene oxide concentration in the preserving liquid is in the aforementioned favorable range, and where the preservation temperature is not higher than 80° C., and further where the molar ratio of the alkylene oxide is less than that of the carboxylic acid or where water coexists. Incidentally, when the water coexists, it is more favorable that the carboxylic acid further exists.

Beforehand decreasing the amount of the residual alkylene oxide in the resin catalyst before the preservation of the resin catalyst also leads to more certain prevention of the residual alkylene oxide from polymerizing and solidifying during the preservation. The method therefor is not especially limited, but examples thereof include: a method that involves decreasing the amount of the unreacted residue of the alkylene oxide by completing the reaction in a state where the addition-receiving substance is in excess to thereby raise the conversion of the alkylene oxide; and a method that involves stripping the residual alkylene oxide by such as vacuum drying.

When the preserving liquid is preserved for a long time, there is a possibility that the composition of the preserving liquid may gradually change. Therefore, the periodical replacement of the preserving liquid with a new one during the preservation is effective in extending the preservation period of the resin catalyst. Especially, in the case of the basic resin catalyst, the carboxylic acid is favorably contained in the new preserving liquid resultant from this replacement.

The resin catalyst which has been preserved in the above way is recycled for the addition reaction of the alkylene oxide to the addition-receiving substance which is carried out in the presence of a resin catalyst, when the preserved resin catalyst may be recycled as the whole or a part of the resin catalyst as used for the aforementioned addition reaction. In addition, a part of the resin catalyst may be replaced with a new one, or a new resin catalyst may be replenished.

If the ratios or amounts of the recycled resin catalyst and the new resin catalyst are operated, the reaction performance or lifetime of the resin catalyst being recycled can be adjusted.

(Effects and Advantages of the Invention)

The process according to the present invention has the following advantages: in a process comprising the step of carrying out an addition reaction of an alkylene oxide to an addition-receiving substance in the presence of a resin catalyst, thereby producing the addition reaction product, when the resin catalyst as used for the reaction is persevered so as to recycle it after it is recovered, the unreacted alkylene oxide remaining in the resin catalyst can be prevented from polymerizing and solidifying during the preservation, and the resin catalyst accordingly can be preserved stably for a long time and then effectively recycled.

Detailed Description of the Preferred Embodiments

Hereinafter, the present invention is more specifically illustrated by the following examples of some preferred embodiments in comparison with comparative examples not according to the invention. However, the invention is not limited to the below-mentioned examples.

EXAMPLE 1

Into a SUS316-made autoclave of 1,000 ml in capacity equipped with stirring blades, 400 ml of anion-exchange resin (trade name: "DIAION PA316", produced by Mitsubishi Chemical Corporation) was placed as a resin catalyst. Thereafter, ethylene oxide and acrylic acid were continuously supplied thereto at rates of 100 g/h and 109 g/h respectively (molar ratio of ethylene oxide/acrylic acid= 1.5). Then, the reaction was carried out under an atmosphere of 1 volume % in oxygen concentration under conditions where: the reaction temperature was 70° C.; the reaction pressure was 0.5 MPa; the concentration of hydroquinone in the reaction mixture was 1,000 weight ppm; and the liquid was continuously extracted in such a manner that the liquid amount would be constantly 600 ml; thus producing 2-hydroxyethyl acrylate. As a result, the ratios of remaining unreacted of acrylic acid and ethylene oxide were 14% and 43% respectively. The reaction was continuously carried out for about 1 day under these conditions.

Thereafter, the reaction mixture was cooled to 20° C. to end the reaction, and then washed with 2-hydroxyethyl acrylate, and thereafter the composition of the liquid was adjusted, thus obtaining a preserving liquid containing the resin catalyst. The initial composition of this preserving liquid was as follows: ethylene oxide=2.5 weight %, acrylic acid=no detection, 2-hydroxyethyl acrylate=about 97 weight %, and hydroquinone=1 weight % (this hydroquinone had beforehand been added.). While the temperature was controlled to 18° C. by passing a heat medium through a jacket, this preserving liquid was preserved under conditions of no agitation, when the apparent volume of the resin catalyst relative to the liquid amount of the whole preserving liquid was about 50 volume %.

After 8 hours from the start of the preservation, the inside of the autoclave was inspected, but either the stirred state or the performance of the resin catalyst was not abnormal. Thus, the preserving liquid containing the resin catalyst was used, exactly as it was, to start the reaction again. As a result, the reaction performance did not change from what it had been before the preservation.

Comparative Example 1

The procedure was carried out in the same way as of Example 1 except that the preserving liquid was preserved while the temperature was controlled to 50° C. by passing the heat medium through the jacket. As a result, when the preserving liquid was checked after about 1 hour from the start of the preservation, there was seen a polymerized product, and the resin catalyst was aggregated and solidified by this polymerized product. Therefore, it was difficult to reuse the resin catalyst.

EXAMPLE 2

After the reaction was carried out in the same way as of Example 1, the composition of the liquid was adjusted as follows: acrylic acid=5 weight %, ethylene oxide=2.5 weight %, 2-hydroxyethyl acrylate=about 91 weight %, and hydroquinone=1 weight %. While the temperature was controlled to 45° C. by passing a heat medium through a jacket, the resultant preserving liquid was preserved under an atmosphere of ordinary pressure and of 3 volume % in oxygen concentration under conditions of no agitation. After 4 hours, the inside of the autoclave was inspected. As a result, there was no problem, and even when the preserved resin catalyst was recycled for a new reaction, the performance of the catalyst did not greatly change from what it had been before the preservation.

EXAMPLE 3

After the reaction was carried out in the same way as of Example 1, the reaction was ended, and then the reaction mixture was washed with 2-hydroxyethyl acrylate, and thereafter the composition of the liquid was adjusted, thus obtaining a preserving liquid containing the resin catalyst. The initial composition of this preserving liquid was as follows: ethylene oxide=0.5 weight %, acrylic acid=no detection, 2-hydroxyethyl acrylate=about 98 weight %, and hydroquinone=1 weight % (this hydroquinone had beforehand been added.). While the temperature was controlled to 45° C. by passing a heat medium through a jacket, this preserving liquid was preserved under conditions of no agitation, when the apparent volume of the resin catalyst relative to the liquid amount of the whole preserving liquid was about 50 volume %.

After 4 hours from the start of the preservation, the inside of the autoclave was inspected. As a result, there was no problem, and even when the preserved resin catalyst was recycled for a new reaction, the performance of the catalyst did not greatly change from what it had been before the preservation.

EXAMPLE 4

After the reaction was carried out in the same way as of Example 1, the reaction was ended, and then the reaction mixture was washed with 2-hydroxyethyl acrylate, and thereafter the composition of the liquid was adjusted, thus obtaining a preserving liquid containing the resin catalyst. The initial composition of this preserving liquid was as follows: ethylene oxide=0.1 weight %, acrylic acid=3 weight %, 2-hydroxyethyl acrylate=about 96 weight %, and hydroquinone=1 weight % (this hydroquinone had beforehand been added.). While the temperature was controlled to 45° C. by passing a heat medium through a jacket, this preserving liquid was preserved under conditions of no agitation, when the apparent volume of the resin catalyst relative to the liquid amount of the whole preserving liquid was about 50 volume %.

After 4 hours from the start of the preservation, the inside of the autoclave was inspected. As a result, there was no problem, and even when the preserved resin catalyst was recycled for a new reaction, the performance of the catalyst did not greatly change from what it had been before the preservation.

EXAMPLE 5

After the reaction was carried out in the same way as of Example 1, only acrylic acid was added to the reaction mixture containing the resin catalyst until the ethylene oxide concentration decreased to 0.1 weight %, and then the resultant mixture was left alone (the acrylic acid concentration was about 5 weight % when the ethylene oxide concentration had decreased to 0.1 weight %), and further its water content was adjusted to 2 weight %. The resultant mixture was preserved by allowing it to stand still at a temperature of 60° C. under an atmosphere of ordinary pressure and of 3 volume % in oxygen concentration under conditions of no agitation for 3 days. As a result, there was no problem, and even when the preserved resin catalyst was recycled for a new reaction, the performance of the catalyst did not change from what it had been before the preservation.

EXAMPLE 6

After the reaction was carried out in the same way as of Example 1, the reaction mixture was cooled to 35° C. to end the reaction, and thereafter the composition of the liquid was adjusted, thus obtaining a preserving liquid containing the resin catalyst. The initial composition of this preserving liquid was as follows: ethylene oxide=2.5 weight %, acrylic acid=5 weight %, 2-hydroxyethyl acrylate=about 90 weight %, and hydroquinone=1 weight % (this hydroquinone had beforehand been added.). While the temperature was controlled to 35° C. by passing a heat medium through a jacket, this preserving liquid was preserved under stirring (tip speed of the stirring blades=2 m/s), when the apparent volume of the resin catalyst relative to the liquid amount of the whole preserving liquid was about 50 volume %.

After 3 days from the start of the preservation, the inside of the autoclave was inspected, but either the stirred state or the performance of the resin catalyst was not abnormal. Thus, the preserving liquid containing the resin catalyst was used, exactly as it was, to start the reaction again. As a result, the reaction performance did not change from what it had been before the preservation.

EXAMPLE 7

After the reaction was carried out in the same way as of Example 1, the resin catalyst was preserved under stirring (tip speed of the stirring blades=2 m/s) in a preserving liquid under conditions where the temperature was controlled to 80° C. by passing a heat medium through a jacket, wherein the composition of this preserving liquid was as follows: ethylene oxide=500 weight ppm, acrylic acid=no detection, water=0.2 weight %, hydroquinone=5,000 weight ppm, and the balance=2-hydroxyethyl acrylate, when the apparent volume of the resin catalyst relative to the liquid amount of the whole preserving liquid was about 80 volume %.

After 1 day from the start of the preservation, the inside of the autoclave was inspected, but there was no problem, and the preserved resin catalyst could be recycled.

EXAMPLE 8

After the reaction was carried out in the same way as of Example 1, the resin catalyst was preserved under stirring (tip speed of the stirring blades=2 m/s) in a preserving liquid under conditions where the temperature was controlled to 15° C. by passing a heat medium through a jacket, wherein the composition of this preserving liquid was as follows: ethylene oxide=no detection, acrylic acid=1 weight %, water=5 weight %, hydroquinone=5,000 weight ppm, and the balance=2-hydroxyethyl acrylate.

After 2 months from the start of the preservation, the inside of the autoclave was inspected, but there was no problem, and the preserved resin catalyst could be recycled.

EXAMPLE 9

After the reaction was carried out in the same way as of Example 1, the resin catalyst was preserved under stirring (tip speed of the stirring blades=1 m/s) in a preserving liquid under conditions where the temperature was controlled to 40° C. by passing a heat medium through a jacket, wherein the composition of this preserving liquid was as follows: ethylene oxide=no detection, acrylic acid=0.5 weight %, 2-hydroxyethyl acrylate=2 weight %, hydroquinone=5,000 weight ppm, and the balance=water.

After 2 weeks from the start of the preservation, the inside of the autoclave was inspected, but there was no problem, and the preserved resin catalyst was not hindered from being recycled.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A process for preserving a resin catalyst for an addition reaction of an alkylene oxide, which comprises the steps of: carrying out a reaction in which an addition reaction product is produced by an addition reaction of an alkylene oxide to an addition-receiving substance in the presence of the resin catalyst; and thereafter recovering and then preserving the resin catalyst;

wherein the step of preserving the resin catalyst is carried out at a low temperature of not higher than 40° C.

2. A process according to claim 1, wherein the step of preserving the resin catalyst is carried out in the presence of a liquid having a water content of not less than 0.2 weight %.

3. A process according to claim 1, wherein the resin catalyst is a basic resin catalyst.

4. A process for producing an addition reaction product, which comprises the step of carrying out an addition reaction of an alkylene oxide to an addition-receiving substance in the presence of a resin catalyst, thereby producing the addition reaction product;

wherein the resin catalyst which has been preserved by the process as recited in claim 1 is recycled for the addition reaction, wherein said resin catalyst has been preserved in the presence of a liquid under conditions where the resin catalyst is swollen with the liquid.

5. A process for preserving a resin catalyst for an addition reaction of an alkylene oxide, which comprises the steps of: carrying out a reaction in which an addition reaction product is produced by an addition reaction of an alkylene oxide to an addition-receiving substance in the presence of the resin catalyst; and thereafter recovering and then preserving the resin catalyst;

wherein the step of preserving the resin catalyst is carried out in the presence of a carboxylic acid.

6. A process according to claim 5, wherein the step of preserving the resin catalyst is carried out in the presence of a liquid having a water content of not less than 0.2 weight %.

7. A process according to claim 5, wherein the resin catalyst is a basic resin catalyst.

8. A process for producing an addition reaction product, which comprises the step of carrying out an addition reaction of an alkylene oxide to an addition-receiving substance in the presence of a resin catalyst, thereby producing the addition reaction product;

wherein a resin catalyst which has been preserved by the process as recited in claim 5 is recycled for the addition reaction.

9. A process for preserving a resin catalyst for an addition reaction of an alkylene oxide, which comprises the steps of: carrying out a reaction in which an addition reaction product is produced by an addition reaction of an alkylene oxide to an addition-receiving substance in the presence of the resin catalyst; and thereafter recovering and then preserving the resin catalyst;

wherein the step of preserving the resin catalyst is carried out in the presence of a liquid having an alkylene oxide concentration of not more than 2 weight %.

10. A process according to claim 9, wherein the step of preserving the resin catalyst is carried out in the presence of a liquid having a water content of not less than 0.2 weight %.

11. A process according to claim 9, wherein the resin catalyst is a basic resin catalyst.

12. A process for producing an addition reaction product, which comprises the step of carrying out an addition reaction of an alkylene oxide to an addition-receiving substance in the presence of a resin catalyst, thereby producing the addition reaction product;

wherein a resin catalyst which has been preserved by the process as recited in claim 9 is recycled for the addition reaction.

13. A process for preserving a resin catalyst for an addition reaction of an alkylene oxide, which comprises the steps of: carrying out a reaction in which an addition reaction product is produced by an addition reaction of an alkylene oxide to an addition-receiving substance in the presence of the resin catalyst; and thereafter recovering and then preserving the resin catalyst;

wherein the step of preserving the resin catalyst is carried out in the coexistence of a carboxylic acid and a liquid having an alkylene oxide concentration of not more than 2 weight %.

14. A process according to claim 13, wherein the step of preserving the resin catalyst is carried out in the presence of a liquid having a water content of not less than 0.2 weight %.

15. A process according to claim 13, wherein the resin catalyst is a basic resin catalyst.

16. A process for producing an addition reaction product, which comprises the step of carrying out an addition reaction of an alkylene oxide to an addition-receiving substance in the presence of a resin catalyst, thereby producing the addition reaction product;

wherein a resin catalyst which has been preserved by the process as recited in claim 13 is recycled for the addition reaction.

17. A process according to claim 5, wherein the step of preserving the resin catalyst is carried out at a temperature of not higher than 100° C.

18. A process according to claim 9, wherein the step of preserving the resin catalyst is carried out at a temperature of not higher than 100° C.

19. A process according to claim 13, wherein the step of preserving the resin catalyst is carried out at a temperature of not higher than 100° C.

* * * * *